(12) United States Patent
Chun et al.

(10) Patent No.: US 9,372,742 B2
(45) Date of Patent: Jun. 21, 2016

(54) SYSTEM AND METHOD FOR SELF-HEALING

(75) Inventors: In Geol Chun, Seoul (KR); Won Tae Kim, Asan-si (KR); Seung Min Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 955 days.

(21) Appl. No.: 13/214,640

(22) Filed: Aug. 22, 2011

(65) Prior Publication Data

US 2012/0124410 A1    May 17, 2012

(30) Foreign Application Priority Data

Nov. 16, 2010    (KR) .................. 10-2010-0113888

(51) Int. Cl.
*G06F 11/07*    (2006.01)

(52) U.S. Cl.
CPC ........ *G06F 11/0736* (2013.01); *G06F 11/0793* (2013.01)

(58) Field of Classification Search
CPC .............. G06F 11/0793; G06F 11/079; G06F 11/3452; G06F 11/004; G06F 11/0736; G06F 11/3055; G06F 11/366
USPC ....................................................... 714/2, 26
See application file for complete search history.

(56) References Cited

U.S. PATENT DOCUMENTS

| | | | |
|---|---|---|---|
| 7,260,743 B2 * | 8/2007 | Fellenstein et al. ............. | 714/26 |
| 7,373,553 B2 * | 5/2008 | Tripp et al. ..................... | 714/37 |
| 7,661,020 B1 * | 2/2010 | Coatney .............. | G06F 11/1084 714/6.32 |
| 8,072,999 B1 * | 12/2011 | Cline et al. ..................... | 370/431 |
| 8,255,902 B1 * | 8/2012 | Satish .................. | G06F 11/008 713/189 |
| 2002/0042039 A1 * | 4/2002 | Kim ................... | A61B 1/00045 433/29 |
| 2004/0015907 A1 * | 1/2004 | Giel et al. ...................... | 717/141 |
| 2005/0198279 A1 * | 9/2005 | Flocken et al. ................ | 709/224 |
| 2006/0122952 A1 * | 6/2006 | Hinchey .............. | G06F 19/3418 706/13 |

(Continued)

FOREIGN PATENT DOCUMENTS

| | | |
|---|---|---|
| KR | 1020080086296 A | 9/2008 |
| KR | 10-2011-0067418 A | 6/2011 |

OTHER PUBLICATIONS

Hyun Sang Yoon, et al., "Context awareness self-healing system under ubiquitous", Autumn Symposium Journal of Korea Intelligent Information System Society, pp. 259-268, Nov. 2004.

(Continued)

*Primary Examiner* — Loan L. T. Truong
(74) *Attorney, Agent, or Firm* — Kile Park Reed & Houtteman PLLC

(57) ABSTRACT

Provided are a system and a method for self-healing in a critical system. The present invention monitors a current situation of the critical system, determines whether a system has an error by analyzing the monitoring result, judges whether to perform self-healing in a current state or drive safety software which provides a minimum basic service according to self-healing of the system error or not when the system error occurs, and evaluates self-healing performance after healing the system error. According to exemplary embodiments of the present invention, it is possible to continuously provide a software service and further improve the reliability of the self-healing system through the evaluation of the self-healing performance.

20 Claims, 7 Drawing Sheets

(56) References Cited

U.S. PATENT DOCUMENTS

| | | | |
|---|---|---|---|
| 2006/0195745 A1* | 8/2006 | Keromytis et al. | 714/741 |
| 2007/0076590 A1* | 4/2007 | Galpin et al. | 370/216 |
| 2007/0299943 A1* | 12/2007 | Ogle | G06F 11/0748 709/221 |
| 2007/0300228 A1* | 12/2007 | White et al. | 718/102 |
| 2008/0168308 A1* | 7/2008 | Eberbach | G06F 11/008 714/26 |
| 2009/0037353 A1* | 2/2009 | Greenwald | G06N 99/005 706/20 |
| 2009/0183023 A1* | 7/2009 | Rathunde et al. | 714/4 |
| 2009/0217235 A1* | 8/2009 | Suenbuel | 717/104 |
| 2010/0011243 A1* | 1/2010 | Locasto et al. | 714/15 |
| 2010/0023810 A1* | 1/2010 | Stolfo et al. | 714/38 |
| 2010/0031090 A1* | 2/2010 | Bernardini et al. | 714/38 |
| 2010/0131952 A1* | 5/2010 | Akiyama | G06F 11/0748 718/100 |
| 2010/0149984 A1* | 6/2010 | Kapoor | H04L 41/0823 370/235 |
| 2010/0153785 A1* | 6/2010 | Keromytis et al. | 714/38 |
| 2010/0223498 A1* | 9/2010 | Schlesinger | G06F 11/1482 714/15 |
| 2010/0241905 A1* | 9/2010 | Avritzer | G06F 11/1438 714/38.13 |
| 2010/0281134 A1* | 11/2010 | Melen et al. | 709/217 |
| 2010/0293407 A1* | 11/2010 | Locasto et al. | 714/2 |
| 2011/0010518 A1* | 1/2011 | Kavuri | G06F 9/50 711/165 |
| 2011/0055920 A1* | 3/2011 | Hariri | 726/22 |
| 2011/0125615 A1* | 5/2011 | Shirbabadi et al. | 705/28 |
| 2011/0289487 A1* | 11/2011 | Song | 717/130 |
| 2012/0016705 A1* | 1/2012 | Milojicic | G06Q 10/04 705/7.11 |
| 2012/0054571 A1* | 3/2012 | Howard et al. | 714/748 |
| 2012/0102363 A1* | 4/2012 | Milojicic et al. | 714/37 |

OTHER PUBLICATIONS

Bumjoo Park, et al., "Highly available self-healing mechanism for intrusion tolerant system", Korean Institute of Information Scientists and Engineers, vol. 31, No. 2, pp. 646-648, Oct. 2004.

* cited by examiner

FIG. 4
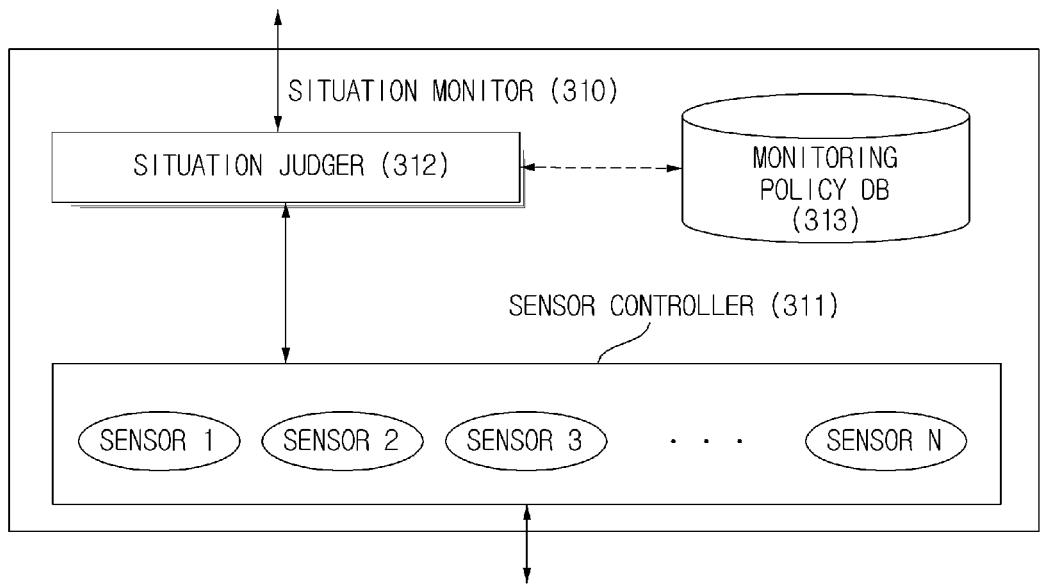
[FIG. 5]
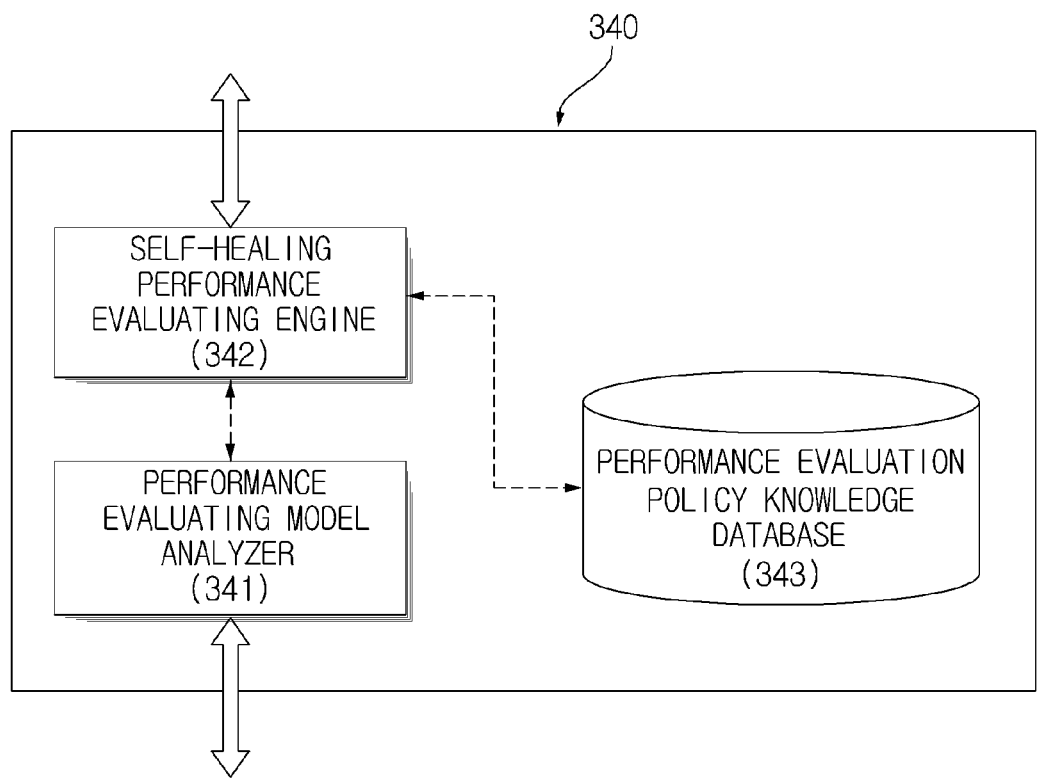

SYSTEM AND METHOD FOR SELF-HEALING

BACKGROUND OF THE INVENTION

1. Field of the Invention

The present invention relates to a system and a method for self-healing. More particularly, the present invention relates to a system and a method for self-healing in a critical system.

2. Description of the Related Art

In recent years, a general embedded system which has been widely used has been designed to perform a predetermined response or process with respect to an input from a user or the outside. However, under an environment where most of the embedded systems are used, a predetermined type input and various types of inputs exist. Even an input which should not be generated may be generated. As a result, such an abnormal input causes an error state of a computer system, which cannot normally operate. In particular, as the embedded system is also used in a safety critical system that affects human lives, a mission critical system for a spaceship or for a military use such as missile guidance which causes huge loss when the system has an error, and a business critical system associated with stocks or shares, the system cannot provide a service or creates an inaccurate result by an external uncertain input. Accordingly, at present, a self-healing technology to allow the system having the error itself to heal the error for numeral operation has been developed.

However, the known self-healing system is configured to individually operate according to its own judgment for each system, such that in an actual world of controlling uncertainty, the known self-healing system cannot judge an overall state of an operating environment. Further, since the known self-healing system does not evaluate a result after performing the self-healing, the self-healing system cannot know whether it appropriately performs self-healing depending on the generated error.

SUMMARY OF THE INVENTION

The present invention has been made in an effort to provide a system and a method for self-healing that self heal an error of a critical system in an actual environment in which various types of application programs operate in numerous systems, and evaluate self-healing performance and use the evaluation result in the next healing when a self-healing function is performed against the generated error.

An exemplary embodiment of the present invention provides a self-healing system including: a system error determining unit analyzing a monitoring result of a system environment or components constituting the system to determine whether the system error occurs; a countermeasure selecting unit selecting a countermeasure depending on whether or not to self-heal the system error when the system error occurs; a software service providing unit continuously providing the software service in the system by reflecting the selected countermeasure; and a healing performance evaluating unit evaluating healing performance on the basis of a healing result when the selected countermeasure is self-healing of the system error.

The countermeasure selecting unit may select self-healing software having the error or executing safety software associated with the software having the error as the countermeasure, or the software service providing unit may includes: a self-healing portion self-healing the software having the error when the selected countermeasure is self-healing of the system error; and a safety software executing unit executing the safety software associated with the software having the error when the selected countermeasure is not the self-healing of the system error. The self-healing portion may include: an internal healing portion internally healing the software by controlling a healing code in the software having the error; and an external healing portion performing healing by adding/modifying/deleting contents of the corresponding software outside the software having the error. The software service providing unit may further include: a service executing portion managing an actuator set for each component and connects a component requesting execution of software and the execution requested software with each other by using the actuator; and a service operation controlling portion controlling the self-healing portion or the safety software executing portion according to the selected countermeasure and simultaneously executing software associated with the same service by considering the system environment.

The self-healing system may further include a monitoring unit monitoring an environment of at least one critical system or components constituting at least one critical system. The self-healing system may further include a defining unit defining at least one of information on a class configuring the component, state information of the component, and relationship information between the components. The monitoring unit may perform monitoring on the basis of the defined information, and the healing performance evaluating unit may evaluate a system characteristic including at least one of reliability and system performability by the defined information as the healing performance.

The healing performance evaluating unit may include: a policy database storing a monitoring policy which forms the basis of a monitoring method, a performance evaluation policy which forms the basis of evaluation of healing performance, and a self-healing policy associated with self-healing; a performance evaluation model analyzing portion separating and analyzing a model for performance evaluation from models to be monitored and determining the performance evaluation policy on the basis of the analysis result; and a healing performance evaluating engine evaluating the self-healing performance on the basis of the determined performance evaluation policy. The healing performance evaluating engine may include: an information collecting portion collecting information associated with the system environment after self-healing; a policy loading portion loading the determined performance evaluation policy when the performance evaluation policy is determined by the performance evaluation model analyzing portion on the basis of the collected information; and a performance evaluating portion quantitatively evaluating the self-healing performance on the basis of the loaded performance evaluation policy, and the performance evaluating may include: an analysis information generating portion analyzing the performance evaluation model for evaluating self-healing performance on the basis of information collected by an information collecting portion and the policy stored in the policy database and generating analysis information on the self-healing performance by comparing a state of the performance evaluation model before self-healing and a state of the performance evaluation model after self-healing with each other; and a policy determining portion determining the performance evaluation policy on the basis of the generated analysis information.

The self-healing system may further include a healing result learning unit that learns the self-healing result for the self-healed software on the basis of the evaluated healing performance and performs learning on the basis of a mechanical learning algorithm when the system performance is deteriorated after self-healing as compared with before self-healing. The healing result learning unit may modify even a predetermined stored monitoring policy according to the performed learning.

Another exemplary embodiment of the present invention provides a self-healing method including: system error determining of analyzing a monitoring result of a system environment or components constituting the system to determine whether the system error occurs; countermeasure selecting of selecting a countermeasure depending on whether or not to self-heal the system error when the system error occurs; software service providing of continuously providing the software service in the system by reflecting the selected countermeasure; and healing performance evaluating of evaluating healing performance on the basis of a healing result when the selected countermeasure is self-healing of the system error.

In the countermeasure selecting, self-healing software having the error or executing safety software associated with the software having the error may be selected as the countermeasure, or the software service providing may include: any one of self-healing of self-healing the software having the error when the selected countermeasure is self-healing of the system error; and safety software executing of executing the safety software associated with the software having the error when the selected countermeasure is not the self-healing of the system error. The self-healing may include: internal healing of internally healing the software by controlling a healing code in the software having the error; and external healing of performing healing by adding/modifying/deleting contents of the corresponding software outside the software having the error. The software service providing may further include: service executing of managing an actuator set for each component and connects a component requesting execution of software and the execution requested software with each other by using the actuator; and service operation controlling of controlling the self-healing portion or the safety software executing portion according to the selected countermeasure and simultaneously executing software associated with the same service by considering the system environment.

The self-healing method may further monitoring an environment of at least one critical system or components constituting at least one critical system. The self-healing method may further include defining at least one of information on a class configuring the component, state information of the component, and relationship information between the components. In the monitoring, monitoring is performed on the basis of the defined information, and the healing performance evaluating unit may evaluate a system characteristic including at least one of reliability and system performability by the defined information as the healing performance.

The healing performance evaluating may include: policy database constructing of storing a monitoring policy which forms the basis of a monitoring method, a performance evaluation policy which forms the basis of evaluation of healing performance, and a self-healing policy associated with self-healing; performance evaluation model analyzing of separating and analyzing a model for performance evaluation from models to be monitored and determining the performance evaluation policy on the basis of the analysis result; and healing performance evaluating engine driving of evaluating the self-healing performance on the basis of the determined performance evaluation policy. The healing performance evaluating engine driving may include: information collecting of collecting information associated with the system environment after self-healing; policy loading of loading the determined performance evaluation policy when the performance evaluation policy is determined by the performance evaluation model analyzing portion on the basis of the collected information; and performance evaluating of quantitatively evaluating the self-healing performance on the basis of the loaded performance evaluation policy, and the performance evaluating model analyzing may include: analysis information generating of analyzing the performance evaluation model for evaluating self-healing performance on the basis of information collected by an information collecting portion and the policy stored in the policy database and generating analysis information on the self-healing performance by comparing a state of the performance evaluation model before self-healing and a state of the performance evaluation model after self-healing with each other; and policy determining of determining the performance evaluation policy on the basis of the generated analysis information.

The self-healing method may further include healing result learning of learning the self-healing result for the self-healed software on the basis of the evaluated healing performance and performing learning on the basis of a mechanical learning algorithm when the system performance is deteriorated after self-healing as compared with before self-healing. In the healing result learning, even a predetermined stored monitoring policy may be changed according to the performed learning.

According to exemplary embodiments of the present invention, it is possible to acquire the following effects by self healing an error of a critical system and in an actual environment in which various types of application programs operate in numerous systems, and evaluating self-healing performance and using the evaluation result in the next healing when a self-healing function is performed against the occurred error. First, it is possible to provide a service depending on the situation by monitoring an operating environment and determining whether to execute safety software or to perform self-healing according to the monitoring result at the time of developing a system for safe self-healing of the critical system. In a real world where various application programs exist, a self-healing method suitable for a characteristic of each application program should be designed and developed. However, it is almost impossible to make an additional self-healing function for each of numerous application programs. In the present invention, it is possible to easily add a self-healing function suitable for each application program and when self-healing is not easy, it is possible to provide a minimum basic service without interrupting the service eve in any case by executing the previously developed safety software which fully is reliable. Second, it is possible to further improve the reliability of the self-healing system as compared with the existing system by evaluating self-healing performance after the self-healing function is performed.

BRIEF DESCRIPTION OF THE DRAWINGS

FIG. 4 is a configuration diagram of a situation monitor;

FIG. 5 is a configuration diagram of a self-healing performance evaluator;

DETAILED DESCRIPTION OF THE EMBODIMENTS

Figure 1:
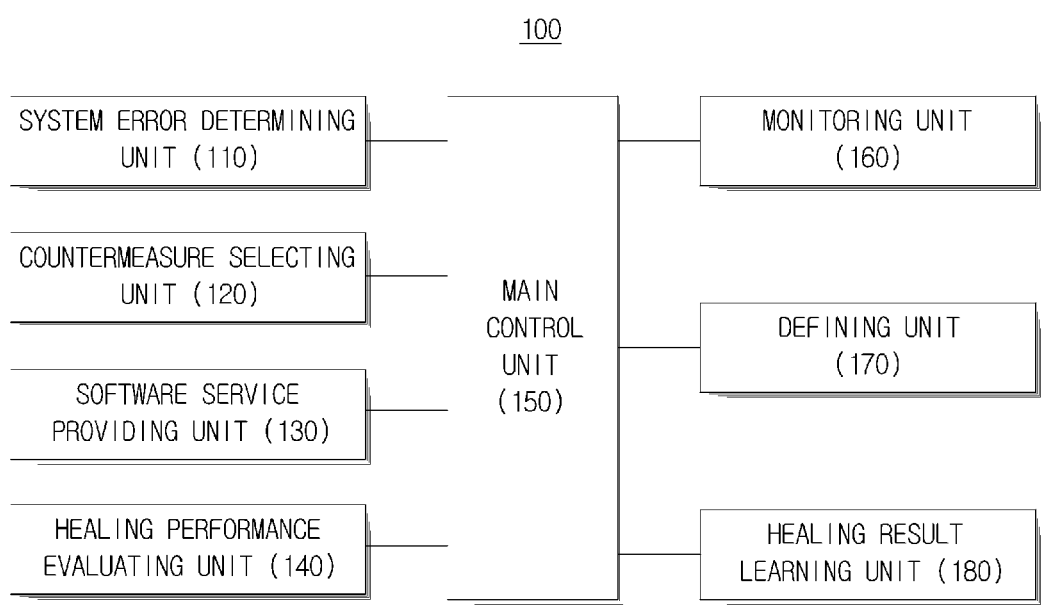
FIG. 1 is a schematic block diagram of a self-healing system according to an exemplary embodiment of the present invention.

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. Further, in describing the present invention, well-known functions or constructions will not be described in detail since they may unnecessarily obscure the understanding of the present invention. Hereinafter, the exemplary embodiments of the present invention will be described, but it will be understood to those skilled in the art that the spirit and scope of the present invention are not limited thereto and various modifications and changes can be made.

Figure 2:
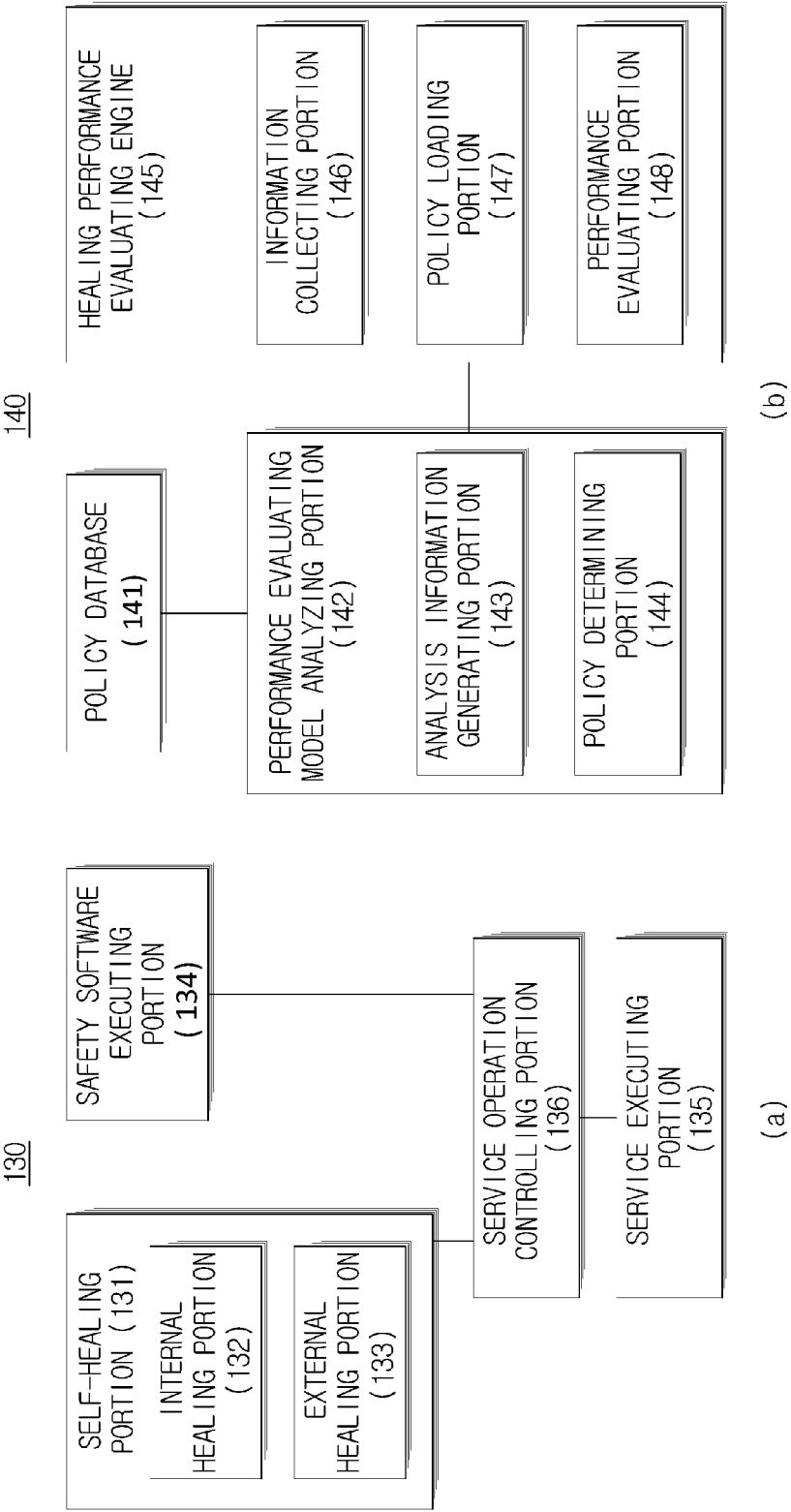
FIG. 2 is a block diagram showing an internal configuration of the self-healing system in detail.

FIG. 1 is a schematic block diagram of a self-healing system according to an exemplary embodiment of the present invention. FIG. 2 is a block diagram showing an internal configuration of the self-healing system in detail. The following description refers to FIGS. 1 and 2.

Referring to FIG. 1, the self-healing system 100 includes a system error determining unit 110, a countermeasure selecting unit 120, a software service providing unit 130, a healing performance evaluating unit 140, and a main control unit 150.

In the exemplary embodiment, the self-healing system 100 is the system for safe self-healing of a critical system. The self-healing system 100 as the system for safe self-healing that self-heals an error which occurs on the critical system monitors an operating environment under which the critical system operates, performs self-healing in order to reconfigure a service of the critical system on the basis of the monitoring result, and updates a healing policy through a method of evaluating the self-healing result when self-healing occurs.

The system error determining unit 110 analyzes a monitoring result of a system environment or components constituting the system to determine whether the system error occurs.

The countermeasure selecting unit 120 selects a countermeasure depending on whether or not to self-heal the system error when the system error occurs. The countermeasure selecting unit 120 selects self-healing software having the error or executing safety software associated with the software having the error as the countermeasure. In the exemplary embodiment, the countermeasure selecting unit 120 may select previously developed software which is fully reliable as the safety software. The safety software is for use in providing a minimum basic service without interrupting the service so as to continuously provide the corresponding software service. The reliability may be acquired by general evaluation of software reliability. Meanwhile, the countermeasure selecting unit 120 may select software having the highest reliability among related software as the safety software.

The software service providing unit 130 continuously provides the software service in the system by reflecting the selected countermeasure.

The software service providing unit 130 includes a self-healing portion 131 and a safety software executing portion 134 as shown in FIG. 2A. The self-healing portion 131 self-heals the software having the error when the selected countermeasure is self-healing of the system error. The self-healing portion 131 may include an internal healing portion 132 or an external healing portion 133. The internal healing portion 132 internally heals the software by controlling a healing code in the software having the error. In contrast, the external healing portion 133 performs healing by adding/modifying/deleting contents of the corresponding software outside the software having the error. The safety software executing unit 134 executes the safety software associated with the software having the error when the selected countermeasure is not the self-healing of the system error.

Meanwhile, the software service providing unit 130 may further include a service executing portion 135 and a service operation controlling portion 136. The service executing portion 135 manages an actuator set for each component and connects a component requesting execution of software and the execution requested software with each other by using the actuator. The service operation controlling portion 136 controls the self-healing portion 131 or the safety software executing portion 134 according to the selected countermeasure. The service operation controlling portion 136 simultaneously executes software associated with the same service by considering the system environment.

The healing performance evaluating unit 140 evaluates healing performance on the basis of a healing result when the selected countermeasure is the self-healing of the system error.

The healing performance evaluating unit 140 may include a policy database 141, a performance evaluation model analyzing portion 142, and a healing performance evaluating engine 145 as shown in FIG. 2B. The policy database 141 stores a monitoring policy which forms the basis of a monitoring method, a performance evaluation policy which forms the basis of evaluation of healing performance, and a self-healing policy associated with self-healing of the software. The performance evaluation model analyzing portion 142 separates and analyzes a model for performance evaluation from models to be monitored and determines the performance evaluation policy on the basis of the analysis result. The performance evaluation model analyzing portion 142 is interlocked with the policy database 141 and utilizes the performance evaluation policy stored in the policy database 141 at the time of determining the performance evaluation policy. The performance evaluation model analyzing portion 142 may include an analysis information generating portion 143 and a policy determining portion 144.

The analysis information generating portion 143 analyzes the performance evaluation model for evaluating self-healing performance on the basis of information collected by an information collecting portion 146 and the policy stored in the policy database 141 and generates analysis information on the self-healing performance by comparing a state of the performance evaluation model before self-healing and a state of the performance evaluation model after self-healing with each other. The policy determining portion 144 determines the performance evaluation policy on the basis of the generated analysis information. The healing performance evaluating engine 145 evaluates the self-healing performance on the basis of the determined performance evaluation policy. The healing performance evaluating engine 145 may include the information collecting portion 146, a policy loading portion 147, and a performance evaluating portion 148. The information collecting portion 146 collects information associated with the system environment after self-healing.

The information associated with the system environment collected by the information collecting portion 146 includes information on an external environment of the system, information on a resource state, log information, an event signal, self-healing information, and the like. The information collecting portion 146 may collect self-healed software, interoperating system information, and the like together. When the performance evaluation policy is determined by the performance evaluation model analyzing portion 142 on the basis of the collected information, the policy loading portion 147 loads the determined performance evaluation policy. The performance evaluating portion 148 quantitatively evaluates the self-healing performance on the basis of the loaded performance evaluation policy.

The main control unit 150 controls an overall operation of each of the units constituting the self-healing system 100.

The self-healing system 100 may further include a monitoring unit 160.

The monitoring unit 160 monitors an environment of at least one critical system or components constituting at least one critical system. The monitoring unit 160 may perform monitoring when the components drive different application programs under the critical system environment.

The self-healing system 100 may further include a defining unit 170. The defining unit 170 defines at least one of information on a class configuring the component, state information of the component, and relationship information between the components. The defining unit 170 includes a state set and a state transition as the state information of the component. The state set may be constituted by a state name, an entrance transition to the state, an escape transition from the state, and the like. The state transition may be constituted by a transition name, a start state of the transition, a purpose state of the transition, and the like. In this case, the monitoring unit 160 may perform monitoring on the basis of the information defined by the defining unit 170. Further, the healing performance evaluating unit 140 may evaluate a system characteristic including at least one of reliability and system performability by the information defined by the defining unit 170 as the healing performance.

The self-healing system 100 may further include a healing result learning unit 180. The healing result learning unit 180 learns the self-healing result for the self-healed software on the basis of the evaluated healing performance. The healing result learning unit 180 may perform learning on the basis of a mechanical learning algorithm when the system performance is deteriorated after self-healing as compared with before self-healing. The healing result learning unit 180 may modify even a predetermined stored monitoring policy according to the performed learning.

Meanwhile, the healing result learning unit 180 may update the self-healing method for the corresponding software on the basis of the evaluated healing performance. In this case, the healing result learning unit 180 changes the self-healing method for the corresponding software from the previous self-healing method to the current self-healing method if the current self-healing method for the corresponding software is more excellent healing rate than the previous self-healing method on the basis of the evaluated healing performance. In contrast, if the previous self-healing method is more excellent healing rate than the current self-healing method, the healing result learning unit 180 maintains the previous self-healing method as the self-healing method for the corresponding software.

Next, an exemplary embodiment of the self-healing system 100 will be described. The self-healing system 100 according to the exemplary embodiment is the system for safe self-healing of the critical system. Recently, as the embedded system starts to be used in various fields, the self-healing system 100 is for use in healing a system that self-monitors the system error and operates without interrupting the service by activating the self-healing function against the generated error. Today, as the embedded system is used in various critical systems including the safety critical system, the mission critical system, the business critical system, and the like, a demand for the reliability of the system is gradually increasing. The self-healing system 100 according to the exemplary embodiment includes a situation monitor monitoring that the critical system operates under an operating environment, a safety software operator managing safety software which is fully reliable by means of only a minimum function, a self-healing manager performing self-healing based on the monitoring result by using a self-healing policy for each situation, a self-healing performance evaluator evaluating the self-healing performance, a service operation manager managing the service of the healed system, a safety software storage, and a situational self-healing system DB.

Hereinafter, a system for safe self-healing of the critical system is referred to as a self-healing management system. Under an actual operating environment where the self-healing management system may be implemented, a plurality of systems exist and a plurality of application programs may be included in each system. Other known arts and components associated with the actual operating environment of the general embedded system will not described and it will be apparently appreciated to those skilled in the art to which the exemplary embodiment belongs that various modes which can be implemented under the actual operating environment in association with a system to be described below exist.

Figure 3:
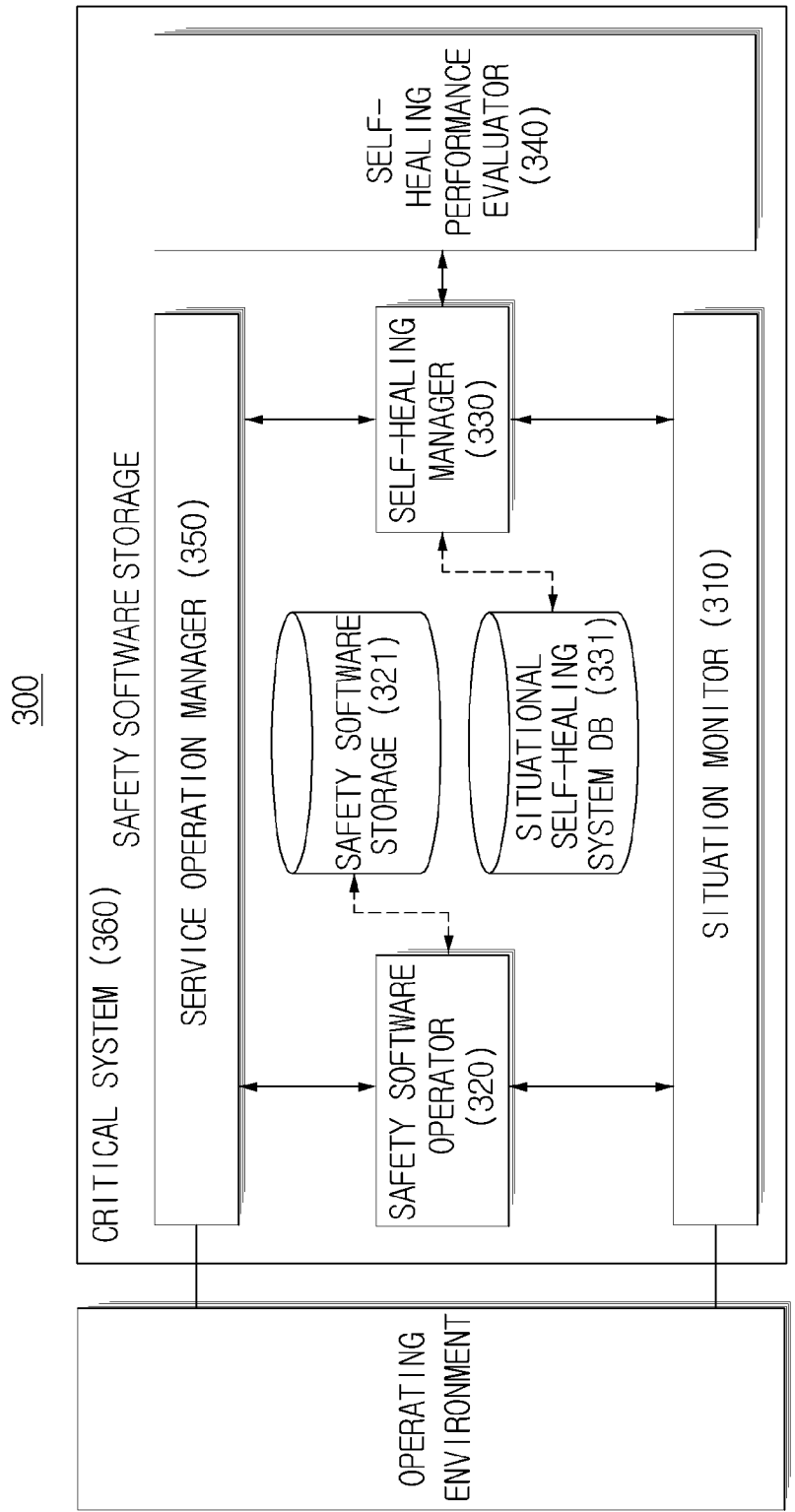
FIG. 3 is a structural diagram of a system for safe self-healing of a critical system.

FIG. 3 illustrates an architecture of a self-healing management system. The self-healing management system 300 may include a situation monitor 310, a safety software operator 320, a self-healing manager 330, a self-healing performance evaluator 340, a service operation manager 350, a safety software storage 321, and a situational self-healing system DB 331.

The situation monitor 310 as a component corresponding to the monitoring unit 160 of FIG. 1 monitors an operating environment of a critical system 360 and components constituting the system 360. The situation monitor 310 primarily monitors an operation state of an application program, an error state which may occur, an abnormal state, and the like under an actual operating environment.

FIG. 4 illustrates an internal configuration of the situation monitor 310.

The situation monitor 310 acquires necessary information through a sensor controller 311 including various sensors. Thereafter, the situation monitor 310 judges whether the critical system is in an error state on the basis of sensing information acquired through a situation judger 312 and judges whether to perform self-healing or operate the safety software in order to solve the error state. Information on a class configuring the component, i.e., an attribute or a function is required in order to provide component-unit monitoring in the situation monitor 310. Accordingly, a system knowledge allowing source code-level monitoring is required by defining information the components constituting the system. Further, the state of the component of accurate intention and information on the actually implemented class are provided by defining the classes constituting the component and the state information. In particular, there is provided information on an influence which is exerted to the entire system when a problem occurs in a predetermined component by including information on the configuration and names of the components constituting the system, information on the relationship between the components, and the like. Each component is configured by information on the classes constituting the component and the state information of the component. The class information is configured by a class set and a relationship set between the classes. The class is configured by a class name, an attribute set, a behavior set, and the like. Names such as the name of the class, the attribute, the function, and the like are required when discriminating a monitoring target by analyzing the implemented code and allow detailed level of monitoring such as generation of the class and change of the attribute, and execution of the function.

The information is stored in a monitoring policy DB 313 of the situation monitor.

The safety software operator 320 performs execution/management/stop functions of the safety software required in link with a safety software storage 321 having software which can operate a minimum service of which each software of the critical system 360 should provide in a fully stable state. The safety software operator 320 corresponds to the safety software executing portion 134 of FIG. 2A.

The self-healing manager 330 performs self-healing of software by using the situational self-healing system DB 331. The self-healing is classified into internal healing internally healing software by controlling an internal healing code in the self-healing manager 330 and external healing performing healing by changing/controlling/performing software in the self-healing manager 330 outside of the software. The self-healing manager 330 corresponds to the self-healing portion 131 of FIG. 2A. The internal healing may be performed by the internal healing portion 132 and the external healing may be performed by the external healing portion 133.

The state information for self-healing is constituted by the state set and the state transition.

The state S configuring the state set is constituted by a state name, an entrance transition to the state, an escape transition from the state, and the like. The state transition T configuring the state transition set is constituted by a transition name, a start state of the transmission, a purpose state, and the like. The state information provides information on a state of a predetermined component when a system error occurs. It is possible to evaluate system characteristics such as reliability of the system, system performability, and the like by monitoring the component of the system and performing self-healing on the basis of the monitoring result. The information is included in the situational self-healing system DB 331.

The self-healing performance evaluator 340 analyzes a situational healing model by using the situational healing system DB 331 through the self-healing manager 330 and evaluates self-healing performance. The self-healing performance evaluator 340 corresponds to the healing performance evaluator 140 of FIG. 1 and the configuration according to the exemplary embodiment is shown in FIG. 5. Referring to FIG. 5, the self-healing performance evaluator 340 includes a performance evaluation model analyzer 341, a self-healing performance evaluating engine 342, a performance evaluation policy knowledge base 343, and the like. The performance evaluation model analyzer 341 corresponds to the performance evaluation model analyzing portion 142 of FIG. 2B and separates and analyzes a performance evaluation information model from a monitoring information model. The self-healing performance evaluating engine 342 which corresponds to the healing performance evaluating engine 145 of FIG. 2B evaluates performance by mounting a performance evaluating module determined in the performance evaluation model analyzer 341. The performance evaluation policy knowledge base 343 which corresponds to the policy database 141 of FIG. 2B may store information including a monitoring policy which may be changed according to the self-healing system, a performance evaluation policy, and data of a self-healing system that takes different measures for various error situations.

Figure 6:
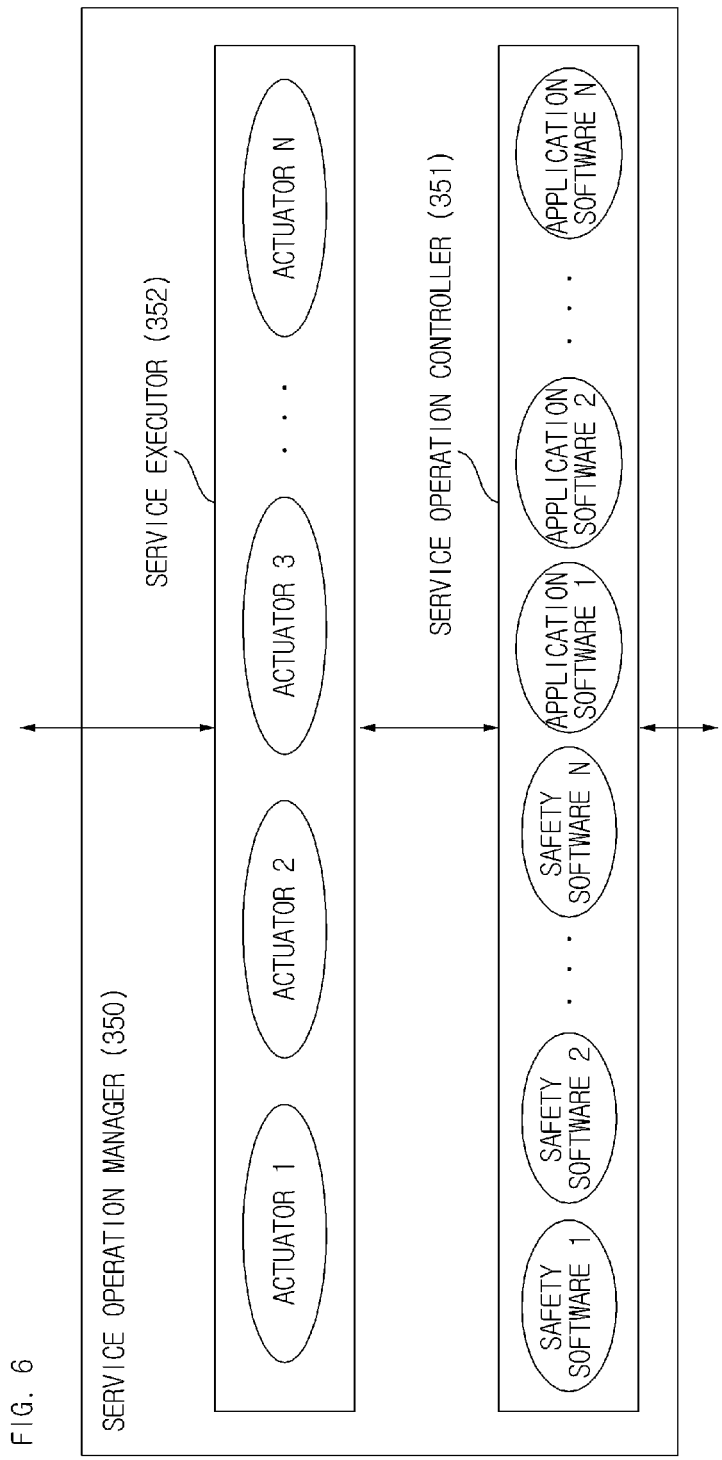
FIG. 6 is a configuration diagram of a service operating manager.

The service operation manager 350 manages software which operates in the critical system 360 and manages an actuator which may influence an external environment. The service operation manager 350 is constituted by a service operation controller 351 and a service executor 352 as shown in FIG. 6. The service operation controller 351 which corresponds to the service operation controlling portion 136 of FIG. 2A and operates appropriate software by judging whether to operate the safety software or operate application software on the basis of the information provided from the safety software operator 320 and the self-healing manager 330.

Since each software is associated with the same service, only one of the safety software and the application software is executed and both the safety software and the application software may be simultaneously executed according to the situation. The service executor 352 which corresponds to the service executing portion 135 of FIG. 2A connects the software executed by the service operation controller 351 and the outside of the critical system with each other. The service executor 352 manages the actuator installed for each critical system and drives the actuator in order to receive a command of the software and apply it to the actual operating environment.

Figure 7:
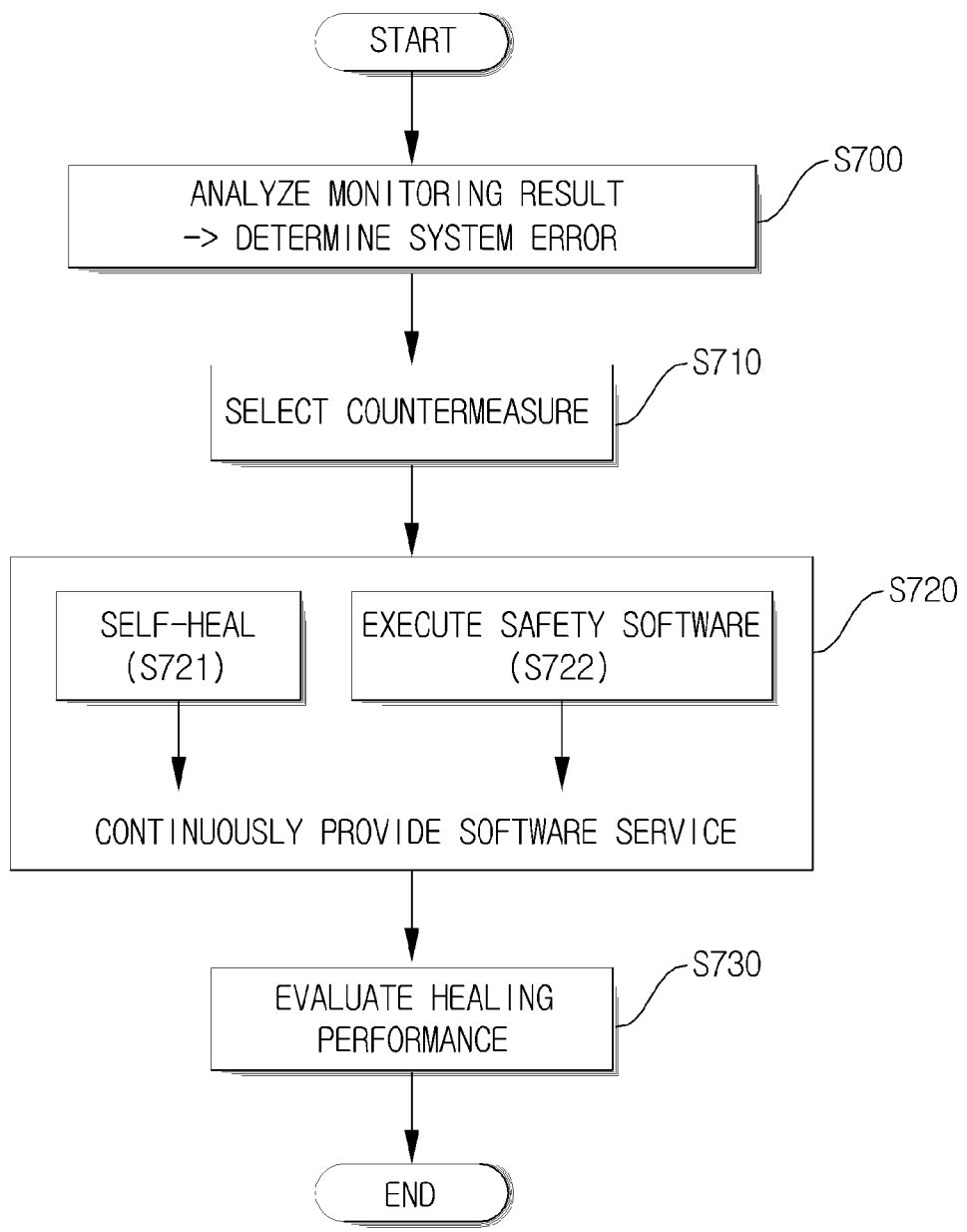
FIG. 7 is a flowchart showing a self-healing method according to an exemplary embodiment of the present invention.

Next, a self-healing method of the self-healing system 100 will be described. FIG. 7 is a flowchart showing a self-healing method according to an exemplary embodiment of the present invention. The following description refers to FIG. 7.

First, a system error determining unit 110 analyzes a monitoring result of a system environment or components constituting the system to determine whether a system error occurs (system error determining step, S700).

When the system error occurs, a countermeasure selecting unit 120 selects a countermeasure whether or not to self-heal the system error (countermeasure selecting step, S710). In the countermeasure selecting step (S710), whether to self-heal software having the error or executing safety software associated with the software having the error as the countermeasure may be selected.

Thereafter, a software service providing unit 130 continuously provides a software service in the system by reflecting the selected countermeasure (software service providing step, S720). The software service providing step (S720) may include any one of a self-healing step (S721) and a safety software executing step (S722). In the self-healing step (S721), the software having the error is self-healed when the selected countermeasure is self-healing of the system error. The self-healing step (S721) may include an internal healing step or an external healing step. In the internal healing step, the software is internally healed by controlling an internal healing code in the software having the error. In the external healing step, healing is performed by adding/modifying/deleting contents of the corresponding software outside of the software having the error. In the safety software executing step (S722), the safety software associated with the software having the error is executed when the selected countermeasure is not the self-healing of the system error.

The software service providing step (S720) may further include a service executing step and a service operation controlling step. In the service executing step, an actuator set for each component is managed and a component requesting execution of software and the execution requested software are connected with each other by using the actuator. The service executing step may be performed before the self-healing step or the safety software executing step. The service operation controlling step is controlled to perform the self-healing step or the safety software executing step according to the selected countermeasure. In the service operation controlling step, software associated with the same service may be simultaneously executed by considering the environment of the system. The service operation controlling step may be performed at the same time as the self-healing step or the safety software executing step.

When the selected countermeasure is self-healing of the system error, a healing performance evaluating unit 140 evaluates healing performance on the basis of a healing result (healing performance evaluating step, S730).

The healing performance evaluating step (S730) may include a policy database constructing step, a performance evaluation model analyzing step, a healing performance evaluating engine driving step, and the like. In the policy database constructing step, a monitoring policy which forms the basis of a monitoring method, a performance evaluation policy which forms the basis of evaluation of healing performance, and a self-healing policy associated with self-healing of software are previously stored. In the performance evaluation model analyzing step, a model for performance evaluation is separated and analyzed from models to be monitored and the performance evaluation policy is determined on the basis of the analysis result. The performance evaluation model analyzing step may include an analysis information generating step and a policy determining step. In the analysis information generating step, the performance evaluation model for evaluating self-healing performance is analyzed on the basis of information collected by an information collecting portion and information stored in the policy database and analysis information on the self-healing performance is generated by comparing a state of the performance evaluation model before self-healing and a state of the performance evaluation model after self-healing with each other. In the policy determining step, the performance evaluation policy is determined on the basis of the generated analysis information. In the healing performance evaluating engine driving step, the self-healing performance is evaluated on the basis of the determined performance evaluation policy. The healing performance evaluating engine driving step may include an information collecting step, a policy loading step, and a performance evaluating step. In the information collecting step, information associated with the system environment is collected after self-healing. In the policy loading step, when the performance evaluation policy is determined by a performance evaluation model analyzing portion on the basis of the collected information, the determined performance evaluation policy is loaded. In the performance evaluating step, the self-healing performance is quantitatively evaluated on the basis of the loaded performance evaluation policy.

The self-healing method according to the exemplary embodiment may further include at least one of a monitoring step, a defining step, and a healing result learning step.

In the monitoring step, an environment of at least one critical system or components constituting at least one critical system is monitored. The monitoring step may be performed before the system error determining step (S700).

In the defining step, at least one of information on a class configuring the component, state information of the component, and relationship information between the components is defined. The defining step may be performed before the monitoring step. In this case, in the monitoring step, monitoring is performed on the basis of the defined information and in the healing performance evaluating step, a system characteristic including at least one of reliability and system performability by the defined information is evaluated as healing performance.

In the healing result learning step, the self-healing result for the self-healed software is learned on the basis of the evaluated healing performance. In the healing result learning step, when the system performability is deteriorated after self-healing as compared with before self-healing, learning is performed on the basis of a mechanical learning algorithm. The healing result learning step may be performed after the healing performance evaluating step (S730). In the healing result learning step, even a predetermined stored monitoring policy may be modified according to the performed learning.

Next, an exemplary embodiment of the self-healing method will be described. The method for safe self-healing of the critical system according to the exemplary embodiment includes monitoring an operating environment of the critical system, judging whether an error occurs by analyzing the monitoring result, determining whether healing is required or an operation of safety software is required, operating the safety software and providing a service, performing self-healing and providing the service, and changing a healing policy by evaluating the self-healing result.

Figure 8:
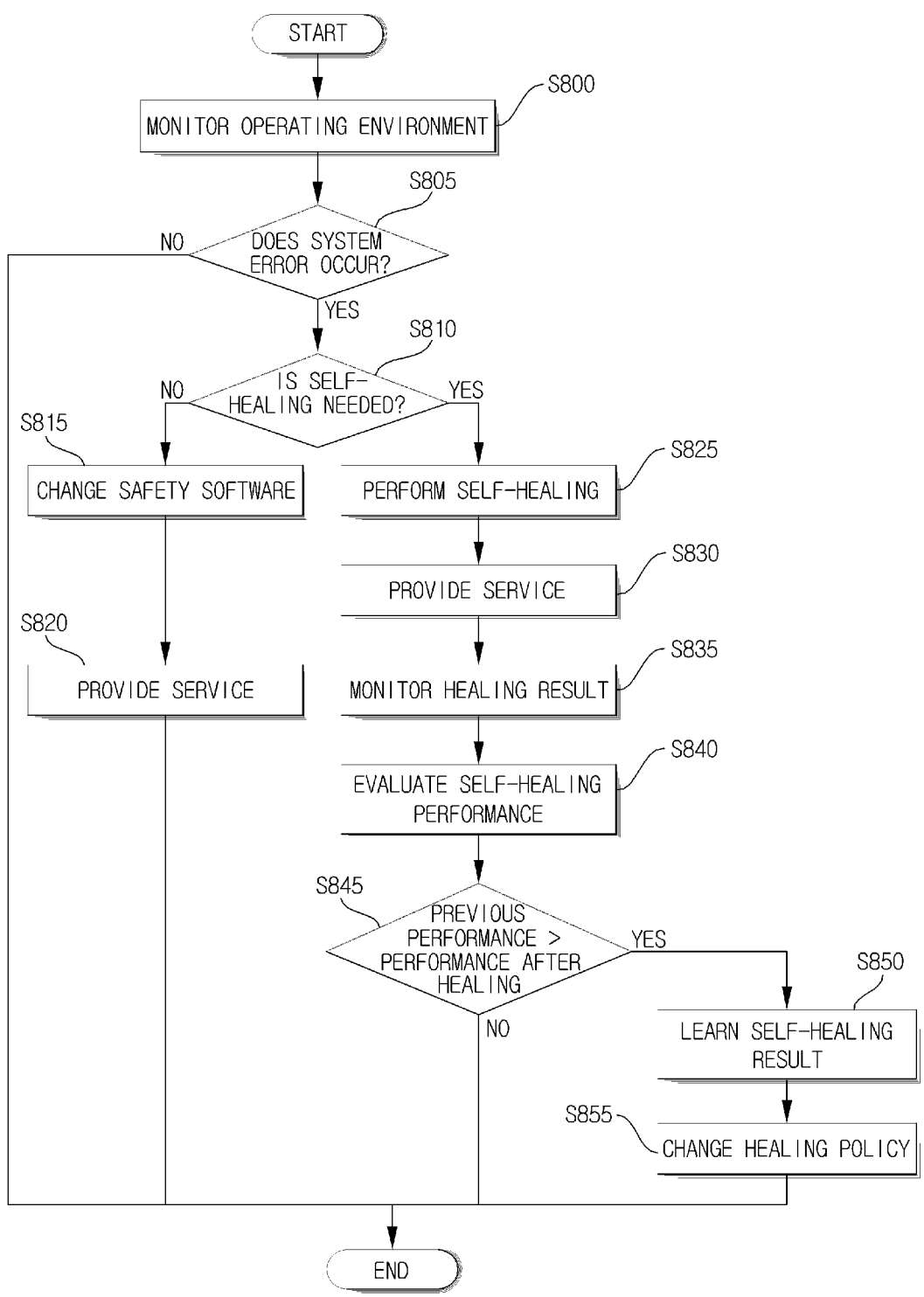
FIG. 8 is a flowchart of an exemplary embodiment of performing a self-healing managing method.

FIG. 8 is a flowchart of an exemplary embodiment of a self-healing managing method. The following description refers to FIG. 8.

In a first step, an environment under which the critical system is operated is monitored by the operating environment monitoring step (S800). The operating environment includes an external actual environment where the system operates and a hardware operating environment or a software operating environment. As the exemplary embodiment, a user may monitor an operating environment which a self-healing system intends to monitor through a graphic user interface.

In a second step, a situation monitor judges whether the critical system is in an error state at present on the basis of the monitoring result (S805). If the critical system is in the error state, the situation monitor determines whether self-healing is required or the safety software should be executed (S810). The safety software is the software which may operate a minimum service which should be provided from each software in a fully stable state and is previously prepared using software passing through software shaping verification and various test techniques by a developer.

In a third step, the safety software is executed (S815). When the safety software is executed, the service is provided by stopping application software corresponding to the existing safety software to be executed, which operates through a safety software operator and changing the corresponding application software into the safety software, which is executed (S820).

In a fourth step which is opposite to the third step, self-healing is required. In this case, self-healing is performed through a self-healing manager (S825). In this step, the self-healing manager controls the healing code in software to perform healing by dividing internal healing internally healing software and external healing performing healing by changing/controlling/modifying software outside of the software in the self-healing manager. The software healed by self-healing manager is loaded on the service operation manager and thereafter, executed to influence the operation of the critical system (S830).

In a fifth step, the self-healing result is evaluated. A self-healing function is performed and thereafter, a self-healing performance evaluator collects various pieces of information of an actual operating environment after self-healing is reflected though the situation monitor (S835). Information collected in this case includes an external environment, a resource state, log information, an event signal, self-healing information, and the like. The collected information includes information regarding a system which interoperates with an application program which performs self-healing under the actual operating environment. A performance evaluating model for evaluating self-healing performance is analyzed by using a situational self-healing system DB and a performance evaluation knowledge base on the basis of the collected information and information for analyzing self-healing performance is generated by comparing states before and after the performance evaluating model is healed. Thereafter, a self-healing performance evaluating module determined through the analysis information is loaded on a self-healing performance evaluating engine. The self-healing performance may be quantitatively evaluated on the basis of the loaded performance evaluating module (S840). The self-healing performance evaluation performed in this step may be reported to the user.

In a sixth step, the self-healing result is learned. Only when the system performance is deteriorated after healing as compared with before healing on the basis of the result quantitatively evaluated in the fifth step (S845), a healing policy is learned on the basis of the mechanical learning algorithm (S850) and the result is reflected to the knowledge base for use in the next healing (S855).

In the self-healing managing method described above, the self-healing system can be appropriately and easily applied according to characteristics or information of a system to which self-healing will be applied and the self-healing execution result can be automatically reported.

An exemplary embodiment can be applied to cyber physical systems (CPS). In particularly, the exemplary embodiment can be applied to CPS for arbitrary control software.

The spirit of the present invention has been just exemplified. It will be appreciated by those skilled in the art that various modifications, changes, and substitutions can be made without departing from the essential characteristics of the present invention. Accordingly, the embodiments disclosed in the present invention and the accompanying drawings are used not to limit but to describe the spirit of the present invention. The scope of the present invention is not limited only to the embodiments and the accompanying drawings. The protection scope of the present invention must be analyzed by the appended claims and it should be analyzed that all spirits within a scope equivalent thereto are included in the appended claims of the present invention.

What is claimed is:

1. A self-healing system, comprising:
   a system error determining unit analyzing a monitoring result of an environment of a system or components constituting the system, and determining whether an error occurs on the basis of the analyzing result;
   a countermeasure selecting unit selecting a countermeasure to solve the error depending on a determination of whether or not to self-heal the error when the error occurs, wherein when the determination is to self-heal the error, the selected countermeasure is self-healing software associated with the error to solve the error and when the determination is to not self-heal the error, the selected countermeasure is executing safety software to solve the error;
   a software service providing unit continuously providing a software service in the system that reflects the selected countermeasure; and
   a healing performance evaluating unit comparing performance of the system after self-healing with performance of the system before self-healing to evaluate healing performance when the selected countermeasure is to self-heal the error, generating analysis information on the self-healing performance by comparing to determine a performance evaluation policy on the basis of the generated analysis information,
   wherein the safety software is for use in providing a minimum basic software service without interrupting the software service so as to continuously provide the software service associated with the software associated with the error.

2. The self-healing system according to claim 1, wherein the software service providing unit includes:
   a self-healing portion self-healing the software associated with the error when the selected countermeasure is to self-heal the error; and
   a safety software executing unit executing the safety software associated with the software associated with the error when the selected countermeasure is to not self-heal the error.

3. The self-healing system according to claim 2, wherein the self-healing portion includes:
   an internal healing portion internally healing the software associated with the error by controlling a healing code in the software associated with the error; and
   an external healing portion performing healing by adding/modifying/deleting contents of a corresponding software outside the software associated with the error.

4. The self-healing system according to claim 2, wherein the software service providing unit further includes:
   a service executing portion managing an actuator set for each component and connects a component requesting execution of software and the execution requested software with each other by using the actuator; and
   a service operation controlling portion controlling the self-healing portion or the safety software executing portion according to the selected countermeasure and simultaneously executing software associated with a same service by considering the environment of the system.

5. The self-healing system according to claim 1, further comprising a monitoring unit monitoring an environment of at least one critical system or components constituting at least one critical system.

6. The self-healing system according to claim 5, further comprising a defining unit defining at least one of information on a class configuring the component, state information of the component, and relationship information between the components.

7. The self-healing system according to claim 6, wherein the monitoring unit performs monitoring on the basis of the defined information, and the healing performance evaluating unit evaluates a system characteristic including at least one of reliability and system performance ability by the defined information as the healing performance.

8. The self-healing system according to claim 1, wherein the healing performance evaluating unit includes:
   a policy database storing a monitoring policy which forms the basis of a monitoring method, the performance evaluation policy which forms the basis of evaluation of healing performance, and a self-healing policy associated with self-healing;
   a performance evaluation model analyzing portion separating and analyzing a model for performance evaluation from models to be monitored and determining the performance evaluation policy on the basis of the analysis result; and
   a healing performance evaluating engine evaluating the self-healing performance on the basis of the determined performance evaluation policy.

9. The self-healing system according to claim 8, wherein the healing performance evaluating engine includes:
    an information collecting portion collecting information associated with the environment of the system after self-healing;
    a policy loading portion loading the determined performance evaluation policy when the performance evaluation policy is determined by the performance evaluation model analyzing portion on the basis of the collected information; and
    a performance evaluating portion quantitatively evaluating the self-healing performance on the basis of the loaded performance evaluation policy, and
    the performance evaluation model analyzing portion includes:
    an analysis information generating portion analyzing the performance evaluation model for evaluating self-healing performance on the basis of information collected by an information collecting portion and the policy stored in the policy database and generating analysis information on the self-healing performance through the comparison by comparing a state of the performance evaluation model before self-healing and a state of the performance evaluation model after self-healing with each other; and
    a policy determining portion determining the performance evaluation policy on the basis of the generated analysis information.

10. The self-healing system according to claim 1, further comprising
    a healing result learning unit that learns the self-healing result for the self-healed software on the basis of the evaluated healing performance and performs learning on the basis of a mechanical learning algorithm when the comparison determines that the performance of the system is deteriorated after self-healing as compared with before self-healing.

11. The self-healing system according to claim 10, wherein the healing result learning unit modifies even a predetermined stored monitoring policy according to the performed learning.

12. A self-healing method, comprising:
    analyzing a monitoring result of an environment of a system or components constituting the system and determining whether an error occurs on the basis of the analyzing result;
    selecting a countermeasure to solve the error depending on a determination of whether or not to self-heal the error when the error occurs, wherein when the determination is to self-heal the error, the selected countermeasure is self-healing software associated with the error to solve the error and when the determination is to not self-heal the system error, the selected countermeasure is executing safety software to solve the error;
    continuously providing a software service in the system that reflects the selected countermeasure; and
    comparing performance of the system after self-healing with performance of the system before self-healing to evaluate healing performance when the selected countermeasure is to self-heal the error,
    generating analysis information on the self-healing performance by comparing to determine a performance evaluation policy on the basis of the generated analysis information,
    wherein the safety software is for use in providing a minimum basic software service without interrupting the software service so as to continuously provide the software service associated with the software associated with the error.

13. The self-healing method of claim 12, wherein continuously providing the software service in the system includes any one of:
    self-healing of the software associated with the error when the selected countermeasure is to self-heal the error; and
    executing the safety software associated with the software associated with the error when the selected countermeasure is to not self-heal the error.

14. The self-healing method according to claim 13, wherein the self-healing of the software includes:
    internally healing the software associated with the error by controlling a healing code in the software associated with the error; and
    performing healing by adding/modifying/deleting contents of a corresponding software outside the software associated with the error.

15. The self-healing method according to claim 13, wherein the continuously providing the software service further includes:
    managing an actuator set for each component and connects a component requesting execution of software and the execution requested software with each other by using the actuator; and
    controlling the self-healing portion or the safety software executing portion according to the selected countermeasure and simultaneously executing software associated with a same service by considering the environment of the system.

16. The self-healing method according to claim 12, further comprising monitoring an environment of at least one critical system or components constituting at least one critical system.

17. The self-healing method according to claim 16, further comprising defining at least one of information on a class configuring the component, state information of the component, and relationship information between the components.

18. The self-healing method according to claim 12, wherein the evaluating healing performance includes:
    storing a monitoring policy which forms the basis of a monitoring method, the performance evaluation policy which forms the basis of evaluation of healing performance, and a self-healing policy associated with self-healing;
    separating and analyzing a model for performance evaluation from models to be monitored and determining the performance evaluation policy on the basis of the analysis result; and
    evaluating the self-healing performance on the basis of the determined performance evaluation policy.

19. The self-healing method according to claim 18, wherein the evaluating the self-healing performance includes:
    collecting information associated with the environment of the system after self-healing;
    loading the determined performance evaluation policy when the performance evaluation policy is determined by the performance evaluation model analyzing portion on the basis of the collected information; and
    quantitatively evaluating the self-healing performance on the basis of the loaded performance evaluation policy, and
    the separating and analyzing the model includes:
    analyzing the performance evaluation model for evaluating self-healing performance on the basis of information collected by an information collecting portion and the policy stored in the policy database and generating analysis information on the self-healing performance through the comparison by comparing a state of the performance evaluation model before self-healing and a state of the performance evaluation model after self-healing with each other; and determining the performance evaluation policy on the basis of the generated analysis information.

20. The self-healing method according to claim 12, further comprising learning the self-healing result for the self-healed software on the basis of the evaluated healing performance and performing learning on the basis of a mechanical learning algorithm when the comparison determines that the performance of the system is deteriorated after self-healing as compared with before self-healing.

* * * * *